(12) United States Patent
Landgraf et al.

(10) Patent No.: US 8,362,655 B2
(45) Date of Patent: Jan. 29, 2013

(54) APPARATUS AND METHOD FOR REDUCING THE ENERGY CONSUMPTION OF A MACHINE OR SYSTEM

(75) Inventors: Guenther Landgraf, Karlstadt (DE); Thomas Buerger, Frankfurt (DE); Jens Bruehl, Lohr (DE)

(73) Assignee: Robert Bosch GmbH, Stuttgart (DE)

( * ) Notice: Subject to any disclaimer, the term of this patent is extended or adjusted under 35 U.S.C. 154(b) by 404 days.

(21) Appl. No.: 12/533,699

(22) Filed: Jul. 31, 2009

(65) Prior Publication Data

US 2010/0026102 A1    Feb. 4, 2010

(30) Foreign Application Priority Data

Jul. 31, 2008   (DE) .................. 10 2008 035 756

(51) Int. Cl.
*H01H 35/00* (2006.01)
*G05B 11/01* (2006.01)

(52) U.S. Cl. .......................... 307/116; 700/14
(58) Field of Classification Search .......... 307/116; 700/14
See application file for complete search history.

(56) References Cited

U.S. PATENT DOCUMENTS

| | | | |
|---|---|---|---|
| 5,925,132 A | 7/1999 | Kadokura | |
| 6,081,752 A * | 6/2000 | Benson et al. | 700/79 |
| 6,404,157 B1 | 6/2002 | Simon | |
| 6,499,102 B1 * | 12/2002 | Ewertz | 713/1 |
| 6,999,823 B2 * | 2/2006 | Nishizawa et al. | 700/12 |
| 7,437,578 B2 * | 10/2008 | Menzl | 713/300 |
| 2004/0122545 A1 | 6/2004 | Akiyama et al. | |
| 2007/0050093 A1 | 3/2007 | Furukawa | |
| 2010/0282088 A1 * | 11/2010 | Deuber et al. | 99/281 |

FOREIGN PATENT DOCUMENTS

| | | |
|---|---|---|
| DE | 693 32 133 T2 | 11/1993 |
| DE | 10 2004 027 541 A1 | 12/2004 |
| DE | 103 17 300 A1 | 12/2004 |
| DE | 10 2006 006 431 A1 | 8/2007 |
| DE | 102006062479 A1 | 7/2008 |
| DE | 102006062603 A1 | 7/2008 |
| EP | 0893 870 A2 | 1/1999 |
| EP | 1854386 A1 | 11/2007 |
| EP | 2 027 799 A1 | 2/2009 |
| JP | 10173840 A | 6/1998 |
| JP | 2002189608 A | 7/2002 |
| JP | 2003062778 A | 3/2003 |
| JP | 2005309016 A | 11/2005 |
| JP | 2007304914 A | 11/2007 |

OTHER PUBLICATIONS

European Search Report from related European Patent Application 09008353.6, dated Mar. 7, 2012, 12 pages.

(Continued)

*Primary Examiner* — Michael Rutland Wallis
(74) *Attorney, Agent, or Firm* — Lathrop & Gage LLP

(57) ABSTRACT

An apparatus for reducing the energy consumption of a machine has a deactivation device and a monitoring device. The deactivation device is embodied for providing a deactivation signal in response to a pre-defined deactivation event. The monitoring device is embodied for switching the machine to an energy-saving mode in response to the deactivation signal in accordance with a pre-defined deactivation rule.

19 Claims, 3 Drawing Sheets

OTHER PUBLICATIONS

English Translation of European Search Report from related European Patent Application 09008353.6, dated Mar. 7, 2012, 5 pages.

German Search Report from related German Patent Application 10 2008 035 756.1, dated Jun. 15, 2009, 4 pages.

Partial English Translation of Office Action from Japanese Patent Application 2009-173051, dated Dec. 2, 2011, 1 page.

* cited by examiner

APPARATUS AND METHOD FOR REDUCING THE ENERGY CONSUMPTION OF A MACHINE OR SYSTEM

RELATED APPLICATIONS

This application claims benefit of priority to German Patent Application Serial No. 10 2008 035 756.1, filed Jul. 31, 2008, the disclosure of which is incorporated herein by reference.

FIELD

The present invention concerns an apparatus and a method for reducing the energy consumption of a machine, which apparatus and method can be used in particular in machines in the field of automation.

BACKGROUND

There is a need for saving energy especially in machines in automation, for instance in the automobile industry. Machines that are turned on consume energy even when they are not performing any action. The only option the operator of the machine has to reduce energy consumption is to turn the entire machine off or to turn off just the power element of the machine.

Important information can be lost if the entire machine is turned off. This includes in particular information that is stored in volatile memory. Therefore, in order to prevent loss of information, the machine cannot be turned off in every situation. In addition, re-starting the machine can take a very long time and frequently some of the data required for the specific situation are no longer available at the machine. Furthermore, in certain situations turning the machine off can lead to impermissible reactions by the actuators in the machine.

BRIEF SUMMARY

It is an object of the present invention to create an apparatus and a method for reducing the energy consumption of a machine and to create a machine that consumes less energy.

This object is attained, for example, using an apparatus in accordance with claim 1, a machine in accordance with claim 11, and a method in accordance with claim 12.

The present invention is based on the finding that the energy consumed by a machine can be reduced in that the machine uses a single-stage, two-stage, or multi-stage shut-off mechanism. Machines can be in the following modes in terms of energy, depending the operating situation:

"Off"

"Sleep Mode": In this mode, only a higher-level control for instance is supplied with control voltage (e.g. 24 V).

"Standby Mode": In this mode, the control voltage (e.g. 24 V) can be applied. For instance, it can be applied only for the drives and the associated control and for ancillary processes, such as for instance a lamp inside the machine.

"Production Readiness Mode": In this mode, "power" (e.g. 380 V) can be applied to all production-related components, such as for instance the drives or ancillary units, such as e.g. hydraulic pumps.

"Production Mode": In this mode, the drives on machines tools can "draw" energy according to the requirements of the operating process, while the ancillary components as a rule run continuously without regard to the spectrum of parts to be produced.

If a machine or system is stopped by an operator, for instance during Production Mode, it switches from Production Readiness to Standby if it is not used for a certain period of time. If the machine/system is not used for a specific additional period of time, it automatically switches to Sleep Mode and after another specific period of time may switch off completely.

One advantage of the invention is found in that the energy a machine consumes can be reduced by approx. 30% if during each period of machine idleness the Standby Mode is activated followed by the Sleep Mode or even turning the machine off entirely.

Another advantage is that loss of information can be prevented when the energy savings mode is activated. In addition, the machine can be re-started very rapidly and all necessary data for the specific situation can be made available to the machine again. Furthermore, impermissible reactions by the machine actuators can be prevented.

The present invention provides an apparatus for reducing the energy consumed by a machine and uses a deactivation device that is embodied for providing a deactivation signal that responds to a pre-defined deactivation event and uses a monitoring device that is embodied for switching the machine to an energy-saving mode in response to the deactivation signal in accordance with a pre-defined deactivation rule.

The present invention furthermore provides a machine having an operating mode and an energy-saving mode, which machine has an inventive apparatus for reducing energy consumption.

The present invention furthermore provides a method for reducing the energy consumed by a machine, using a step that provides a deactivation signal in response to a pre-defined deactivation event and using a step that switches the machine to an energy-saving mode in accordance with a pre-defined deactivation rule in response to the deactivation signal.

An inventive computer programming product with programming code means that are stored on a computer-readable data carrier is provided for performing the inventive method when this computer program is performed on a computer or a corresponding computing unit, in particular an inventive apparatus.

BRIEF DESCRIPTION OF THE DRAWINGS

Preferred exemplary embodiments of the present invention shall be explained in greater detail in the following, with reference to the attached drawings.

DETAILED DESCRIPTION OF THE DRAWINGS

Figure 1:
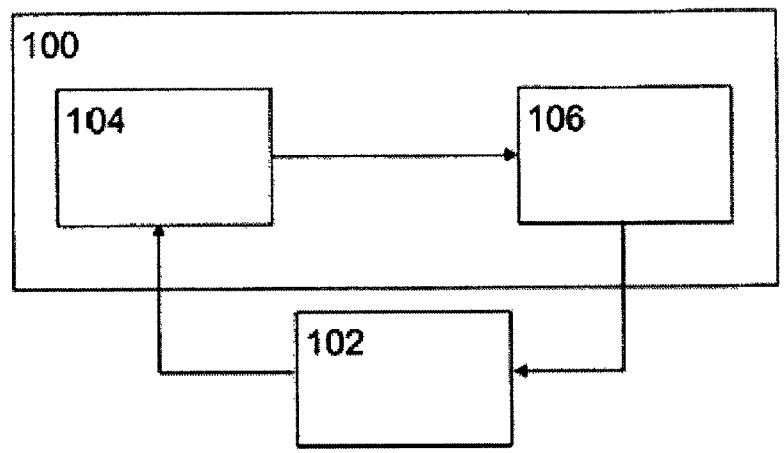
FIG. 1 is a schematic depiction of an inventive apparatus, according to an embodiment.

FIG. 1 depicts an apparatus 100 for reducing the energy consumed by a machine 102 in accordance with one exemplary embodiment of the present invention. The apparatus 100 has a deactivation device 104 and a monitoring device 106.

The deactivation device 104 is embodied for providing a deactivation signal in response to a pre-defined deactivation event. The deactivation event can be comprised in that the machine is in Production Readiness for a pre-defined period of time, so that for instance it is not executing any production task. To this end, the deactivation device 104 can be coupled to the machine 102 and for instance have a time monitor. The time monitor can be embodied for providing the deactivation signal when the machine is in an idle mode for the pre-defined period of time.

The monitoring device 106 is embodied for switching the machine 102 to an energy-saving mode in response to the deactivation signal in accordance with a pre-defined deactivation rule. The deactivation rule can have an algorithm or a sequence of instructions for switching the machine 102 from an operating mode to the energy-saving mode. Using the deactivation rule can ensure that the machine 102 does not experience any undesired modes and that there is no data loss when the machine 102 is switched to the energy-saving mode.

In accordance with the deactivation rule, the monitoring device 106 can be embodied to secure operating information for the machine when it is switched to the energy-saving mode. In particular, the monitoring device 106 can be embodied for transferring data in a volatile memory in the machine 102 to a non-volatile memory when there is a switch to the energy-saving mode. In order to secure the entire memory, the monitoring device 106 can be embodied for securing data from different locations. The operating information to be secured can be for instance firmware, parameters, control programs, or configuration data.

If the machine has at least one actuator, the monitoring device 106 can be embodied for monitoring a function of the actuator when the machine 102 is switched to the energy-saving mode. This can prevent impermissible functioning of the actuator.

On machine tools it can happen that a machine operator stops the machine in the middle of a tool change and then turns the machine off. Depending on the configuration, in such critical situations it can happen that, due to the switching-off process, a tool that is for instance disposed in a transfer gripper that is for instance between tool store and tool spindle, falls from the gripper. In such a situation there may be two problems. As a certain on/off switching-off condition of the gripper, the open condition was assumed, which is not true for such a situation (e.g., incorrect design of the turned-off gripper condition). Moreover, frequently the tools are switched for the internal sequence chain by means of variables that are either defined locally or are stored in a volatile memory (e.g., incorrect projection of the sequence). Even in cases in which the internal sequence chain is created by means of global, permanent variables, that is, variables that retain their condition even when the machine is turned off, frequently the special cases, such as interruption within a tool change when the machine is turned back on, are not taken into account or are not adequately taken into account. Frequently there is not an appropriate entry into the internal sequence chain (e.g., inadequate programming safeguards for special cases).

In order to provide safeguards for these special situations that were only inadequately accounted for in the design or in terms of the software, the monitoring device 106 can for instance ensure that it is not possible to turn off the machine/system during a tool change procedure, even if the machine has already been in Standby Mode or Sleep Mode for a defined period of time. It would not be possible to turn the machine off until the conclusion of such a tool change process.

The monitoring device can be embodied such that it monitors all relevant actuators with respect to safely turning off the machine. It is also possible for the tasks of the monitoring device 106 to migrate to the deactivation device 104 or for both devices to be in one module.

If the machine has a plurality of sub-systems, the monitoring device 106 can be embodied for switching individual sub-systems or all sub-systems to the energy-saving mode in response to the deactivation signal.

Furthermore, the monitoring device 106 can be embodied for switching the machine to a first energy-saving mode in response to a first deactivation signal and to a second energy-saving mode in response to a second deactivation signal (possibly turning the machine off). In the second energy-saving mode, machine energy consumption can be less than in the first energy-saving mode. If the machine 102 has a control electronics unit and at least one actuator, the monitoring device 106 can for instance be embodied for supplying energy to the control electronics unit and to the actuator in the first energy-saving mode and for supplying energy only to the control electronics unit in the second energy-saving mode. Thus the energy the machine 102 consumes in the second energy-saving mode is reduced significantly, since it is possibly not turned on any more or possibly only the control electronics unit is ready to operate, but additional actuators are not. Additional energy-saving modes can also be provided depending on the type of machine.

The monitoring device 106 can furthermore be embodied for switching the machine 102 from the energy-saving mode back to an operating mode. To this end, the deactivation device 104 can be embodied for providing an activation signal in response to a pre-defined activation event. For instance, the activation event can be an input by a user of the machine 102. The monitoring device 106 can be embodied for switching the machine 102 from the energy-saving mode to the operating mode in response to the activation signal in accordance with a pre-defined activation rule. The activation rule can ensure that when the machine 102 is switched to the operating mode, data that were previously secured are provided again and the machine 102 does not perform any undesired actions.

The apparatus 100 can be embodied for performing the inventive method for reducing the energy consumption of the machine 102. A deactivation signal can be provided in a first step. The deactivation signal can be provided in response to a pre-defined deactivation event. The machine can be switched to an energy-saving mode in a second step. The switch can be made in response to the deactivation signal in accordance with a pre-defined deactivation rule.

The apparatus 100 for reducing the energy consumption of the machine 102 can be embodied as a stand-alone unit and can be arranged separate from the machine 102. Alternatively, the apparatus 100 can be integrated in the machine 102 or as a software program within the NC controller.

The machine 102 can be a machine from the field of automation with a focus on the field of CNC (computerized numerical controller), PLC (programmable logic controller), motion, or robotics. Motion includes for instance drives and motion controllers. The machine 102 can have one or a plurality of actuators. The actuator can be a power element, for instance in the form of one or a plurality of hydraulic pumps or drives. Furthermore, a Standby Mode or Sleep Mode can be available in the machine 102 or can be set using appropriate activation. The machine can also be embodied as a system, for instance an automation system.

In accordance with one exemplary embodiment, the machine 102 can be a machine that can be employed in the field of production. The machine 102 can be a production system. The machine 102 can have five operating modes (see above). In the Production Mode, the machine 102 is fully functional and can satisfy a production task for which it is provided. The machine 102 consumes the most energy in this mode. In the Production Readiness Mode, a power element of the machine 102 can have no power. For instance a drive in the machine 102 can be still and mechanical parts of the machine can have no holding torque. In this mode, however, as a rule on older machines all components/actuators are still "under power". The machine 102 consumes less energy than in the Production Mode, since the process-specific forces, such as for instance in machine tools during cutting, are no longer to be applied. In the Standby Mode only limited functionality can be provided for the machine 102. For instance, only a control voltage of 24 V can be applied and thus only the control and drive electronics for the machine 102 are active. It is also possible for a field bus to be operationally ready in the machine 102 or for other components that are relevant to machine operation, such as an illumination device within the machine, to be turned on. In this mode the machine 102 consumes less energy than in the Production Readiness Mode. The control voltage for the drive electronics and for all other components that are still active in the Standby Mode is turned off in the Sleep Mode. The machine 102 can be switched completely off in the Off Mode, and thus no functionality is provided. Energy consumption by the machine 102 is lowest in this mode or equals zero in this mode.

For increasing the energy efficiency of the machine 102, if it is not satisfying any production task the machine 102 can initially be switched from the Production Mode to the Production Readiness Mode. Then the machine 102 can be switched to the Standby Mode, then to the Sleep Mode, and as needed even to the Off Mode. The individual modes can each be activated in a time-controlled manner. Alternatively, the individual modes can also be set for ancillary processes by the machine manufacturer or by a user using the control panel for the machine or using the control program. It is also possible to skip over individual modes depending on the situation or machine. Steps can be executed in the reverse sequence in order to switch the machine 102 back to the Production Mode.

Depending on the part to be produced, individual components/actuators, for instance having discrete decentralized control devices, can contain an apparatus 100 that ensures that the respective component/actuator is switched from Production Mode to Standby Mode and then to Sleep Mode. In this manner an apparatus 100 in a drive can ensure for instance that a tool that has been provided an associated axis that for instance moves a tool magazine is switched to the Standby Mode or to the Sleep Mode until the next positioning task or until the next tool change.

Figure 2:
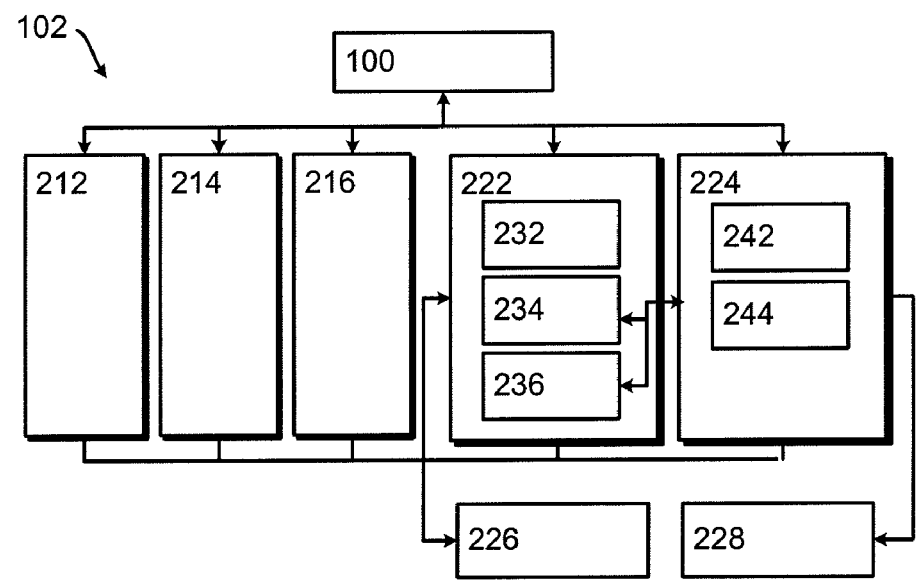
FIG. 2 depicts the basic principle of an inventive Sleep Mode, according to an embodiment.

FIG. 2 depicts a schematic depiction of the basic principle for an energy-saving mode in the form of a Sleep Mode in accordance with one exemplary embodiment of the present invention. FIG. 2 depicts an apparatus 100 in the form of a monitoring entity for reducing the energy consumption of a machine 102. The machine 102 has one or a plurality of controls. The control can be an additional control for a computer, for instance a PC. The control can be embodied in the form of a plug-in card. If necessary, the control can include the apparatus 100. If necessary, the apparatus 100 could also be decentralized in the individual components with a discrete control unit, e.g. a drive.

The control (NC, motion, PLC, RC controller) can have a memory with a file system 212, a buffered memory 214, and a non-buffered memory 216. Furthermore, the control can have a numerical controller (NC) and/or motion controller and/or RC controller 222 and or a programmable logic controller (PLC) 224. The monitoring entity 100 can be coupled to the file system 212, the buffered memory 214, the non-buffered memory 216, the numerical controller 222, and the programmable logic controller 224. The machine 102 can furthermore have a plurality of drives 226 and inputs and outputs (I/Os) 228. The drives 226 can be coupled to the numerical control 222. The I/Os 228 can be coupled to the programmable logic controller 224. The numerical controller 222 can have a set interpretation unit 232, set preparation unit 234, and a set execution unit 236. The programmable logic controller 224 can have a plurality of tasks, of which a "Task 1" 242 and a "Task 2" 244 are depicted.

The Sleep Mode depicted in FIG. 2 can be used for instance for automation systems. The inventive Sleep Mode in particular makes it possible to switch the machine on and off rapidly without erroneous conditions on the machine or system.

In particular the entire volatile memory can be copied to a fixed disk or a buffered memory (core dump) and when needed can be re-loaded. This occurs rapidly and no data are lost. Furthermore, an entity that can be embodied in the software can control the switching off and the switching on so that it is not possible for impermissible reactions to occur in the machine.

The monitoring entity can perform a sequence of steps when it is switched off and when it is switched on. The machine manufacturer can define the individual steps. In this manner application-specific numerical controller (NC) or motion programs or programmable logic controller (PLC) programs can be executed on the different sub-systems in a defined sequence.

As initial trials on machine tools regarding energy efficiency have demonstrated, current consumption can be reduced by up to 30% when machines/systems are consistently turned off when idle.

Figure 3:
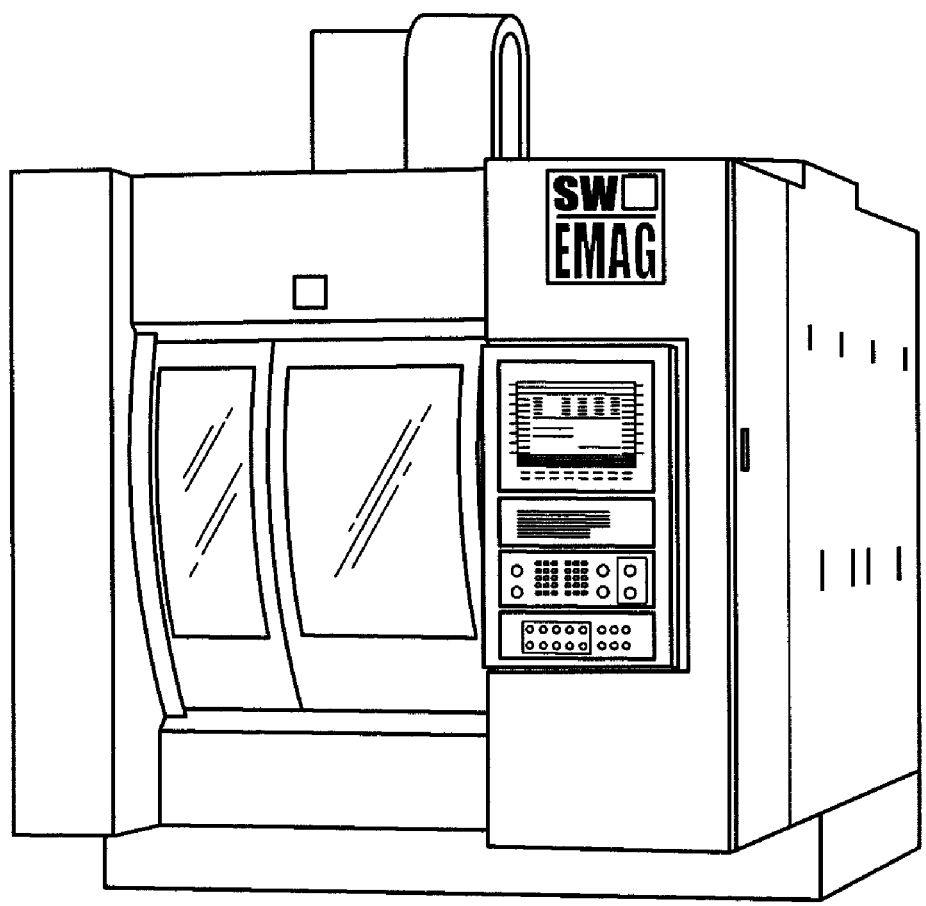
FIG. 3 depicts an inventive machine, according to an embodiment.

FIG. 3 depicts a machine in accordance with one exemplary embodiment of the present invention.

Figure 4:
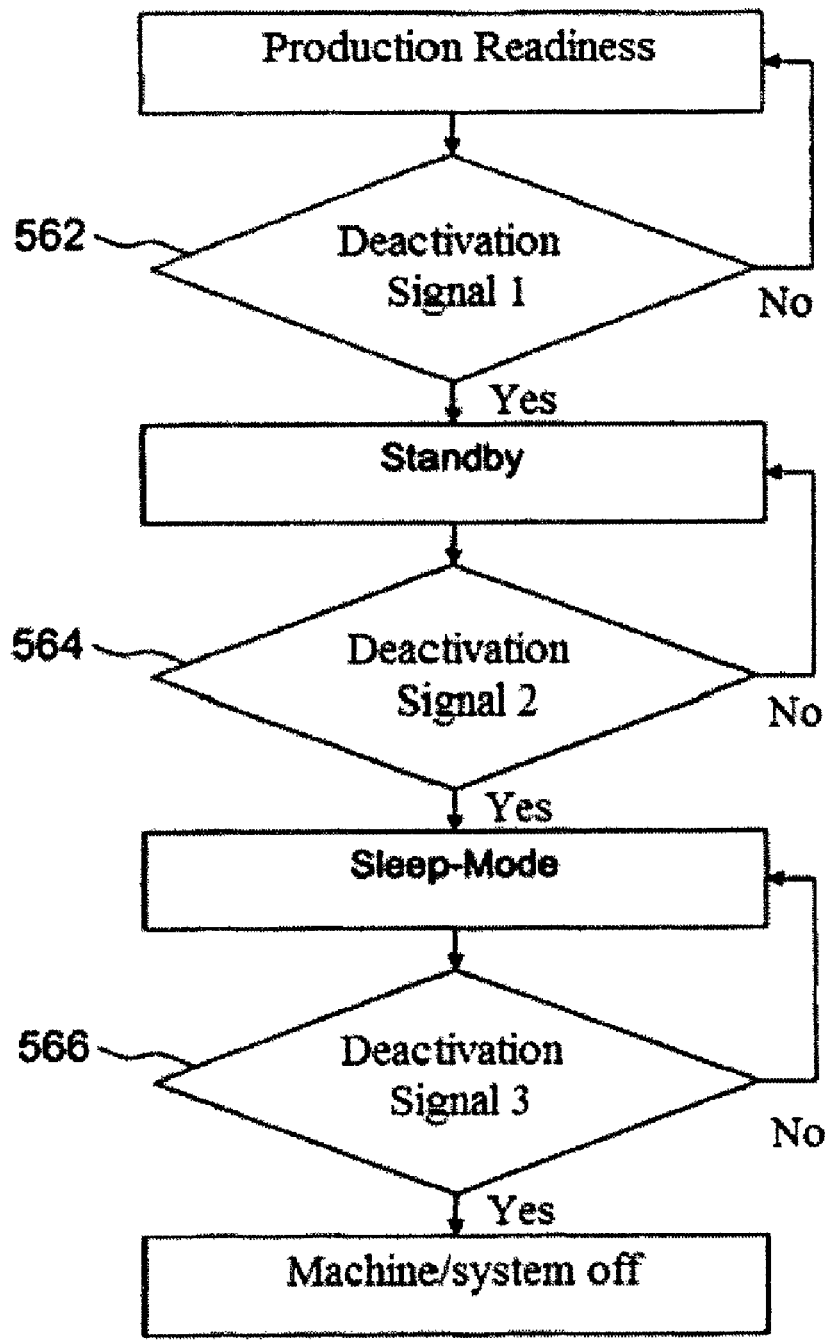
FIG. 4 depicts one possible version of the logic for the deactivation device, according to an embodiment.

FIG. 4 depicts one possible formulation for the logic in the deactivation device.

In accordance with one exemplary embodiment, for reducing the energy consumption of a machine the apparatus can have a first monitoring entity 562, a second monitoring entity 564, and a third monitoring entity 566. The first monitoring entity 562 can be embodied to switch the machine from the Production Readiness Mode to the Standby Mode as a function of a first deactivation signal or to leave it in the Production Readiness Mode. The second monitoring entity 564 can be embodied to switch the machine from the Standby Mode to the Sleep Mode as a function of a second deactivation signal or to leave it in the Standby Mode. The third monitoring entity 564 can be embodied to switch the machine from the Sleep Mode to the Machine/System Mode as a function of a third deactivation signal or to leave it in the Sleep Mode.

The first monitoring entity 562 can have a deactivation device 1 and a monitoring device 1. The deactivation device can be embodied for providing a deactivation signal 1 in response to a pre-defined deactivation event 1. The monitoring device 1 can be embodied for switching the machine to an energy-saving mode (Standby Mode) in response to the deactivation signal 1 in accordance with a pre-defined deactivation rule 1. Moreover, with the second monitoring entity 564, a deactivation device 2 and a monitoring device 2 can be provided. The deactivation device 2 can be embodied for providing a deactivation signal 2 upon a pre-defined deactivation event 2. The monitoring unit 2 can be embodied for switching the machine/system to the Sleep Mode corresponding to the deactivation signal 2 in accordance with a pre-defined deactivation rule 2. Analogously, another deactivation apparatus 3 that turns the machine completely off from the Sleep Mode is possible for the third monitoring entity 566, as depicted in FIG. 4.

In accordance with this exemplary embodiment, the inventive machine is a machine with off operating mode (Production Operation and Production Readiness) and an energy-saving mode (Standby and off), and that has an inventive apparatus for reducing energy consumption.

In accordance with this exemplary embodiment, the inventive method for reducing the energy consumption of a machine can have a step of providing one or two deactivation signals in response to a pre-defined deactivation event 1 and/or 2, and a step of switching the machine to an energy-saving mode (Standby Mode and/or Sleep Mode) in accordance with a pre-defined deactivation rule 1 and/or 2 in response to the deactivation signal 1 and/or 2. In like manner, the machine can be turned off in a further step by means of another deactivation unit 3 and associated monitoring unit.

The inventive apparatus can have multiple uses in one machine or system. If the machine or system has a higher-level control, the apparatus can be arranged in a centralized manner in the higher-level control. This can be the case for instance in production systems, such as for example transfer machines. If the machine or system has a plurality of controls, for example if an entire production system is being operated, the apparatus or a plurality of apparatus can be arranged in a decentralized manner in the plurality of controls.

Furthermore, the inventive apparatus can also be used in a decentralized manner in lower-level "intelligent" components and/or actuators. For instance, the apparatus can be arranged in a decentralized manner in individual lower-level components and/or actuators having a discrete control, as e.g. in a drive controller or in a pump controller.

Furthermore, the separation between monitoring and deactivation can be eliminated. In particular functions by the monitoring unit can be executed in the deactivation unit and vice versa. Both sub-units can also be melded in a single unit.

The exemplary embodiments described were selected only as examples and can be combined with one another.

Changes may be made in the above methods and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

Legend

100 Apparatus
102 Machine
104 Deactivation device
106 Monitoring device
212 File system
214 Buffered memory
216 Non-buffered memory
222 Numerical controller
224 Programmable logic controller
226 Drives
228 I/Os
232 Set interpretation
234 Set preparation
236 Set execution
242 Task 1
244 Task 2
562 First monitoring entity
564 Second monitoring entity
566 Third monitoring entity

We claim:

1. An apparatus for reducing the energy consumption of a machine, comprising:
    a deactivation device configured and arranged to provide a deactivation signal in response to a pre-defined deactivation event; and
    a monitoring device configured and arranged to switch the machine to an energy-saving mode in response to the deactivation signal in accordance with a pre-defined deactivation rule, the monitoring device including:
        a first entity for switching the machine from a production mode to a first energy-saving mode in response to a first deactivation signal, the first energy-saving mode being a production readiness mode, in which a power element of the machine has no power,
        a second entity for switching the machine to a second energy-saving mode in response to a second deactivation signal different from the first deactivation signal, the machine consuming less energy in the second energy-saving mode than in the first energy-saving mode, the second energy-saving mode being a stand-by mode, in which only a control voltage is applied to the machine, and
        a third entity for switching the machine to a third energy-saving mode in response to a third deactivation signal different from the first and second deactivation signals, the machine consuming less energy in the third energy-saving mode than in the second energy-saving mode, the third energy-saving mode being a sleep mode, in which all components that are active in the stand-by mode are turned off.

2. The apparatus in accordance with claim 1, wherein the deactivation device includes a time monitor configured and arranged to provide the deactivation signal when the machine is in an idle mode for a pre-defined period of time.

3. The apparatus in accordance with claim 1, wherein the monitoring device is configured and arranged to secure operating information for the machine when the machine is switched to the energy-saving mode.

4. The apparatus in accordance with claim 1, wherein the monitoring device is configured and arranged to transfer data in a volatile memory in the machine to a non-volatile memory when the machine is switched to the energy-saving mode.

5. The apparatus in accordance with claim 1, wherein the machine has at least one actuator, and wherein the monitoring device is configured and arranged to monitor a function of the actuator to prevent an impermissible function by the actuator when the machine is switched to the energy-saving mode.

6. The apparatus in accordance with claim 1, wherein the machine has a plurality of sub-systems, and wherein the monitoring device is configured and arranged to switch the plurality of sub-systems to the energy-saving mode in response to the deactivation signal.

7. The apparatus in accordance with claim 1, the machine comprising a control electronics unit and at least one actuator, the monitoring device configured and arranged to:
    supply energy to the control electronics unit and the actuator in the first energy-saving mode; and
    supply energy to the control electronics unit without supplying energy to the actuator in the second energy-saving mode.

8. The apparatus in accordance with claim 1, wherein the deactivation device is configured and arranged to provide an activation signal in response to a pre-defined activation event, and wherein in the monitoring device is configured and arranged to switch the machine from the energy-saving mode to an operating mode in response to the activation signal in accordance with a pre-defined activation rule.

9. A machine having an energy-saving mode, the machine comprising a power element and an apparatus for reducing energy consumption of the machine, the apparatus comprising:
   a deactivation device configured and arranged to provide a deactivation signal in response to a pre-defined deactivation event; and
   a monitoring device configured and arranged to switch the machine to an energy-saving mode in response to the deactivation signal in accordance with a pre-defined deactivation rule, the monitoring device including:
      a first entity for switching the machine from a production mode to a first energy-saving mode in response to a first deactivation signal, the first energy-saving mode being a production readiness mode, in which the power element has no power,
      a second entity for switching the machine to a second energy-saving mode in response to a second deactivation signal different from the first deactivation signal, the machine consuming less energy in the second energy-saving mode than in the first energy-saving mode, the second energy-saving mode being a stand-by mode, in which only a control voltage is applied to the machine, and
      a third entity for switching the machine to a third energy-saving mode in response to a third deactivation signal different from the first and second deactivation signals, the machine consuming less energy in the third energy-saving mode than in the second energy saving mode, the third energy-saving mode being a sleep mode, in which all components that are active in the stand-by mode are turned off.

10. The machine in accordance with claim 9, the machine being selected from the group consisting of a CNC-controlled machine, a PLC-controlled machine, a motion-controlled machine, and a robot-controlled machine.

11. A method for reducing the energy consumption of a machine, comprising the following steps:
   providing a deactivation signal in response to a pre-defined deactivation event; and
   switching the machine to an energy-saving mode in accordance with a pre-defined deactivation rule in response to the deactivation signal, the step of switching including the sub-steps of:
      switching the machine from a production mode to a first energy-saving mode in response to a first deactivation signal, the first energy-saving mode being a production readiness mode, in which a power element of the machine has no power,
      switching the machine to a second energy-saving mode in response to a second deactivation signal different from the first deactivation signal, the machine consuming less energy in the second energy-saving mode than in the first energy-saving mode, the second energy-saving mode being a stand-by mode, in which only a control voltage is applied to the machine, and
      switching the machine to a third energy-saving mode in response to a third deactivation signal different from the first and second deactivation signals, the machine consuming less energy in the third energy-saving mode than in the second energy-saving mode, the third energy-saving mode being a sleep mode, in which all components that are active in the stand-by mode are turned off.

12. A non-transitory computer readable medium on which is stored a computer program for reducing energy consumption of a machine, the computer program comprising instructions, which, when executed by a computer, performs the steps of:
   providing a deactivation signal in response to a pre-defined deactivation event; and
   switching the machine to an energy-saving mode in accordance with a pre-defined deactivation rule in response to the deactivation signal, the step of switching including the sub-steps of:
      switching the machine from a production mode to a first energy-saving mode in response to a first deactivation signal, the first energy-saving mode being a production readiness mode, in which a power element of the machine has no power,
      switching the machine to a second energy-saving mode in response to a second deactivation signal different from the first deactivation signal, the machine consuming less energy in the second energy-saving mode than in the first energy-saving mode, the second energy-saving mode being a stand-by mode, in which only a control voltage is applied to the machine, and
      switching the machine to a third energy-saving mode in response to a third deactivation signal different from the first and second deactivation signals, the machine consuming less energy in the third energy-saving mode than in the second energy-saving mode, the third energy-saving mode being a sleep mode, in which all components that are active in the stand-by mode are turned off.

13. The apparatus in accordance with claim 1, wherein the monitoring device further includes a fourth entity for switching the machine to a fourth energy-saving mode in response to a fourth deactivation signal different from the first, second, and third deactivation signals, the machine consuming less energy in the fourth energy-saving mode than in the third energy saving mode, the fourth energy-saving mode being an off-mode where the machine provides no functionality.

14. The apparatus in accordance with claim 13, wherein the fourth entity is capable of preventing the machine from being switched to the fourth energy-saving mode until the conclusion of a tool change process of the machine.

15. The apparatus in accordance with claim 1, the power element comprising one or more of a hydraulic pump and a machine drive.

16. The apparatus in accordance with claim 1, the first, second, and third entities being different entities.

17. The method in accordance with claim 11, the step of switching the machine to the energy saving mode further including the sub-step of:
   switching the machine to a fourth energy-saving mode in response to a fourth deactivation signal different from the first, second, and third deactivation signals, the fourth energy saving mode being an off-mode where the machine provides no functionality;
   wherein the sub-step of switching the machine to the fourth energy-saving mode is not executed until the conclusion of a tool change process of the machine.

18. The method in accordance with claim 11, the step of switching the machine to the energy saving mode further including the sub-step of monitoring a function of an actuator of the machine to prevent impermissible functioning of the actuator during the step of switching the machine to the energy saving mode.

19. The method in accordance with claim 11, wherein:
the sub-step of switching the machine from the production mode to the first energy-saving mode comprises supplying energy to a control electronics unit of the machine and to an actuator of the machine; and
the sub-step of switching the machine to the second energy-saving mode comprises supplying energy to the control electronics unit without supplying energy to the actuator.

* * * * *